United States Patent [19]
Collins, III et al.

[11] Patent Number: 5,845,090
[45] Date of Patent: Dec. 1, 1998

[54] SYSTEM FOR SOFTWARE DISTRIBUTION IN A DIGITAL COMPUTER NETWORK

[75] Inventors: Theodore Joseph Collins, III, St. Paul; Scott Roy Anderson, Eden Prairie; Steven James McDowall, Coon Rapids; Charles Henry Kratsch, Lino Lakes; Joseph Paul Larson, Golden Valley, all of Minn.

[73] Assignee: Platinium Technology, Inc., Oak Brook Terrace, Ill.

[21] Appl. No.: 723,051

[22] Filed: Sep. 30, 1996

Related U.S. Application Data

[63] Continuation of Ser. No. 194,925, Feb. 14, 1994, abandoned.

[51] Int. Cl.[6] ............................ G06F 15/177; G06F 9/445
[52] U.S. Cl. ............................... 395/200.51; 395/200.32; 395/712; 395/653
[58] Field of Search ........................... 395/200.5, 200.51, 395/200.52, 200.32, 200.56, 712, 651, 652, 653

[56] References Cited

U.S. PATENT DOCUMENTS

| | | | |
|---|---|---|---|
| 4,999,806 | 3/1991 | Chernow et al. | 395/700 |
| 5,155,837 | 10/1992 | Liu et al. | 395/200.1 |
| 5,155,847 | 10/1992 | Kirouac et al. | 395/200.09 |
| 5,247,683 | 9/1993 | Holmes et al. | 395/700 |
| 5,367,683 | 11/1994 | Brett | 395/700 |
| 5,367,686 | 11/1994 | Fisher et al. | 395/700 |
| 5,410,703 | 4/1995 | Nilsson et al. | 395/700 |
| 5,421,009 | 5/1995 | Platt | 395/200.1 |
| 5,421,017 | 5/1995 | Scholz et al. | 395/700 |
| 5,434,999 | 7/1995 | Goire et al. | 395/200.09 |
| 5,638,494 | 6/1997 | Pinard et al. | 395/200.32 |
| 5,652,887 | 7/1997 | Dewey et al. | 395/712 |
| 5,655,081 | 8/1997 | Bonnell et al. | 395/200.32 |

OTHER PUBLICATIONS

"Star Sentry, Software Manager 21" Users Guide 1994 May AT&T.
"Software Update Distribution System", Fry 1992.
Frye Inc., "Software Update and Distribution System" Version 1, ©1992.
C.H. Kratsch et al, Electronic Software Distribution: The Key to Distributed Computing, (Nov. 1993) (White Paper, copy enclosed).

(List continued on next page.)

Primary Examiner—Mark H. Rinehart
Attorney, Agent, or Firm—Schwegman, Lundberg, Woessner & Kluth, P.A.

[57] ABSTRACT

A process of distributing software and data in a digital computer network by combining the software and data, together with programs and data known as methods, into single entities referred to as Packages, and then by using specific techniques to transmit Packages from one computer to another. The methods are operable on a Target digital computer to unpack and perform useful functions such as installing and backing out software on the Target digital computer, collecting data from the Target digital computer and forwarding it to another digital computer, or completing a system administration function on the Target digital computer. The techniques used in transmitting Packages between digital computers includes use of Agent software to transfer and activate Packages at appropriate times. The techniques also include forwarding multiple copies of Packages received on a slow network connection to one or more digital computers connected on faster network connections. The techniques also include temporarily storing one or more Packages for later transmission to computers which connect occasionally to the network. Further, the techniques include limiting simultaneous transfers to Target digital computers based on network capacity and topology. The techniques also include limiting the type of software and data which each Package may affect on a Target digital computer, to more easily manage which Packages must be backed out in what order from the Target digital computers. Finally, the techniques also include constructing Packages which contain some software and data which depends on the configuration of the Target digital computer, and transferring only that part of the Package which is appropriate for each Target digital computer's configuration.

28 Claims, 8 Drawing Sheets

OTHER PUBLICATIONS

J. Huntington–Lee, Excellence Award: ViaTech's Xfer, Managing Distributed Systems Newsletter, (Jan. 1994).

Hewlett Packard, HP Distributed Management Environment (DME) Technologies, (Jun. 1993), (Marketing literature, copy enclosed).

Open Software Foundation (OSF), OSF Distributed Management Environment Rationale, (Sep. 1991) Discussion Paper, copy enclosed).

Kristin Marks, Easy Transport, LAN Magazine, (Jul. 1993) (Copy enclosed).

Legent Corporation, Electronic Software Distribution, (May 1993) (Marketing literature, copy enclosed).

NCR Corporation, Star SENTRY Software Management, (Oct. 1992) (Marketing literature, copy enclosed).

Tivoli Corporation, Tivoli/Courier, (Jun. 1993) (Marketing literature, copy enclosed).

Bill Kirwin, Software Distribution: Getting the Code to the Node, (May 1993) (Paper presented to Twelfth Annual Office Automation Systems Conference, copy enclosed).

J. William Semich. "Control Thousands of Desktop Apps!" Datamation, Dec. 12, 1993; p. 18 (Copy enclosed).

Steven J. Vaughan. "Reach Out and Touch Someone With RemoteWare." PC Computing, Dec. 1993: p. 146 (Copy enclosed).

Paula Musich. "Frye adds WAN support to NetWare Distribution software." PC Week, Nov. 29, 1993: p. 49 (Copy enclosed).

Mary Jo Foley. "Sun unit ships downsizing tools." PC Week, Nov. 22, 1993: p. 41 (Copy enclosed).

Eric Smalley. "Banyan plans file distributor." PC Week, Oct. 4, 1993: p. 22 (Copy enclosed).

Jean S. Bozman. "Software distribution key to open systems." Computerworld, Oct. 18, 1993: p. 85 (Copy enclosed).

Matt Kramer. "LAN software maintenance made easier." PC Week, Jan. 18, 1993: p.63 (Copy enclosed).

Steve Higgins. "Reach to ship sofware–distribution system." PC Week, Nov. 9, 1992: p. 27 (Copy enlcosed).

Stephan Loudermilk. "Startup releases client/server distribution system." *PC Week, Nov. 2, 1992:* p. 6 (Copy enclosed).

Beth Freedman. "Software Vendors Bet Big on Electronic Distribution." PC Week, Jul. 6, 1992: p.133 (Copy enclosed).

Rosemary Hamilton. "Tools on way to track micro packages." Computerworld, May. 11, 1992: p. 1 (Copy enclosed).

Paula Musich. "Spectrum Offering Will Fill NetWare Hole." PC Week, Jun. 17, 1991: p. 4 (Copy enclosed).

SYSTEM FOR SOFTWARE DISTRIBUTION IN A DIGITAL COMPUTER NETWORK

This is a continuation of application Ser. No. 08/194,925, filed Feb. 14, 1994 now abandoned.

TECHNICAL FIELD OF THE INVENTION

The present invention pertains to the field of digital computing equipment, and particularly to the application of computing equipment to distributed networks of computer networks.

BACKGROUND OF THE INVENTION

Digital computing equipment (computers) are often electrically connected to other digital computer equipment through internetworks of wiring and software. Each computer in an internetwork requires programs and data (software) to operate. Traditionally, software is entered into a computer through removable magnetic media, such as magnetic tape or removable disks. Because each computer in a large internetwork requires its own copy of software, and since a relatively few administrators must install and update software on every computer in a network, distributing software throughout a network by traditional techniques is time-consuming, error-prone, or impractical.

Distributing software by transmitting it through the network between computers is known in the art as Electronic Software Distribution (ESD). ESD can reduce the number of administrators required to install and update software in a network, and improve the speed and accuracy of software distribution. Existing software distribution techniques, however, are often unreliable, inefficient, and incomplete. The present invention is an improvement over existing techniques, employing advanced processes and methods of ESD.

SUMMARY OF THE INVENTION

The present invention is a process for transferring digital computer software and data from one digital computer to one or more digital computers through a network of electrical connections between the two or more digital computers. The process includes combining the software and data, together with digital computer programs and data called methods which are operable on digital computers to act on the software and data, into a single entity called a Package. The process further includes transferring Packages from one digital computer to one or more digital computers through the network by a specific technique. This transfer technique includes mechanisms for uniform transfer control called Profiles, automatic modification of Package contents based on recipient's configuration called Criteria, and network capacity control to limit network consumption called Transmission Windows and Congestion Control Groups. Each Package can either install software and data, collect data, or accomplish a useful system administration function on a digital computer. A key feature of the present invention, which distinguishes it in the art, is the use of object technology to encapsulate Packages, such that the transfer is not a mere transmission and receipt of binary data from one digital computer to another. Instead, the present invention uses the computing resources available on each digital computer in the network to instrument the Package objects to install, backout, collect and forward, or configure themselves.

DETAILED DESCRIPTION OF THE PREFERRED EMBODIMENT

The present invention is a means of distributing software in a digital computer network by using the network to transmit Software Packages. Software Packages are the fundamental unit of transfer in the present invention. Packages are transferred between a Network Management Server and Distribution Targets. Any digital computer electrically connected to the network is a potential Distribution Target, while one or more computers are pre-designated as the Network Management Server for a given network. There are three types of Software Packages: Distribution Packages, Collection Packages, and Command Packages. Distribution Packages contain methods and data for installing computer programs and data on one or more Distribution Targets. Collection Packages contain methods for collecting data from Distribution Targets (in this context called Collection Targets), and forwarding that data to one Distribution Target (in this context called a Collection Receiver). Command Packages contain methods for accomplishing a system administration task on a Distribution Target (in this context called a Command Target).

This detailed narrative describes the invention in terms used in the art which may have different meanings than the terms of the same name in patent law. Specifically, terms common in object technology, such as object, data, and method, do not necessarily connote the same meaning as they have as terms of art in patent law. An object is an entity which contains data and methods. Data is generic information represented in digital form. Methods are programs or instructions operable on a digital computer, which, when applied to the data of an object, produce a desired and consistent result.

Figure 1:
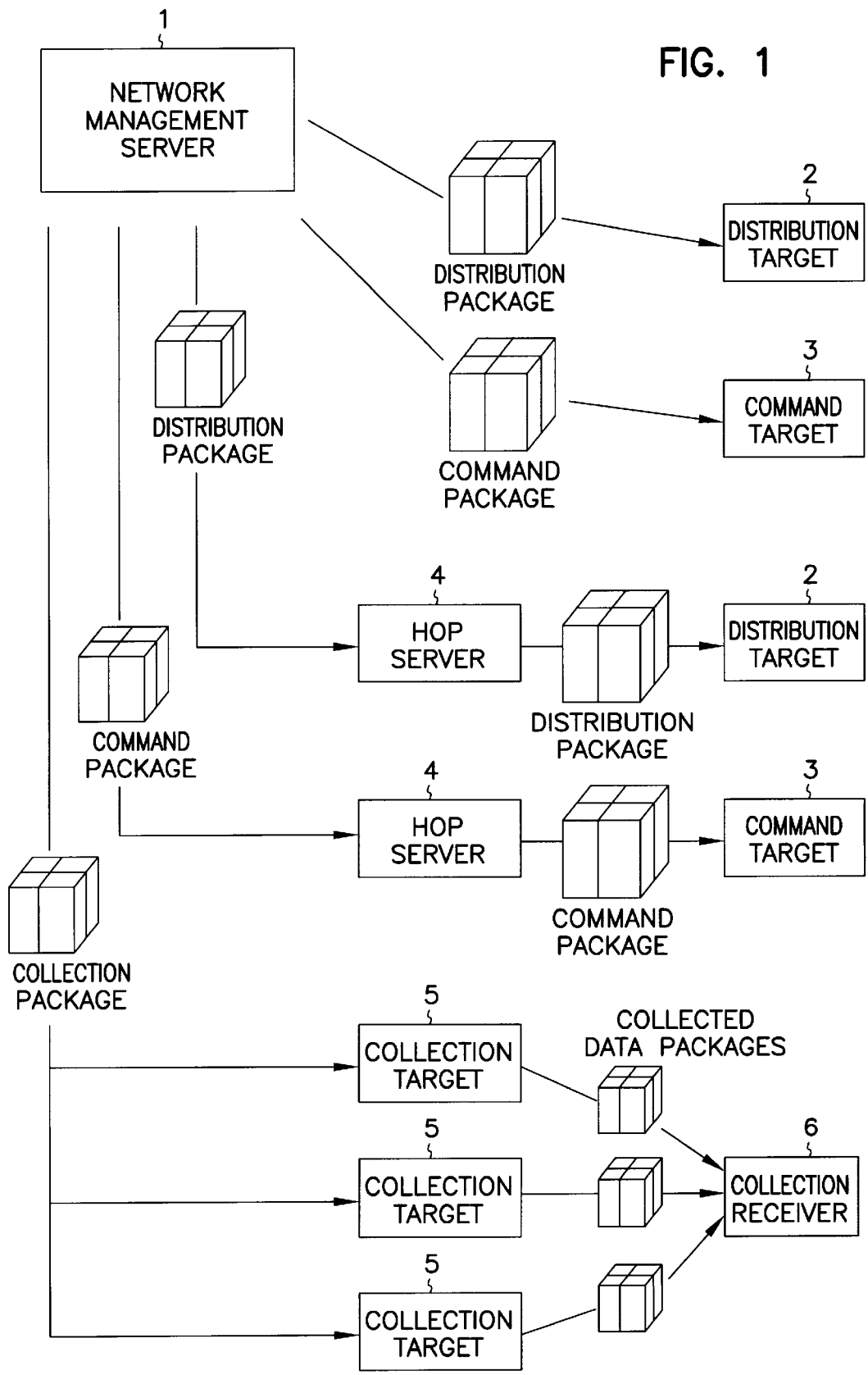
FIG. 1 is a block diagram of the functions accomplished by the present invention.

FIG. 1 is a block diagram of the functions accomplished by the present invention. The Network Management Server (NMS) (1) is a digital computer electrically connected to one or more internetworks, and pre-designated as the NMS. The NMS acts as the central repository of Software Packages for the network. It also acts as the central distribution point for Software Packages for the network. An alternative embodiment includes one or more NMS platforms, with one acting as the "Master" NMS for the enterprise internetwork.

A Distribution Target (2) is another digital computer electrically connected to the NMS through one or more internetworks. A Distribution Target receives Software Packages from the NMS, and sends a digital message to the Package to initiate the installation. Each Distribution may be scheduled on the NMS to occur on or after a specific point in time, or to occur periodically without further manual intervention by a system administrator on the NMS. Each Distribution may send one or more packages to one or more Distribution Targets.

A Command Target (3) is another name for a Distribution Target when it receives and acts on a Command Package. Command Packages are identical to Distribution Packages, except that they contain a different set of methods. The methods contained in a Distribution Software Package act, among other things, to unpack data from the Software Package and install it on a Distribution Target. The methods contained in a Command Package, by contrast, act on data to perform a system administration function on the Command Target.

A Hop Server (4) is a digital computer which stores a Software Package and then forwards it to one or more Distribution Targets. Although not pictured, all three types of Software Packages may be transmitted through a Hop Server. The purpose of a Hop Server is to reduce network traffic across slow and expensive resources, such as Wide Area Networks (WANs). Hop Servers enable the NMS to transmit a Software Package once to the Hop Server, which in turn can forward the Package to many Targets on its Local Area Network (LAN). Although not pictured, Hop Servers may distribute to additional Hop Servers.

Both the NMS and Hop Servers employ a technique known as Transmission Windows. A Transmission Window is a configurable parameter on the NMS and Hop Server(s) which sets the maximum number of simultaneous transmissions which can occur at a given time. As one transmission completes, another is started, until all Targets for a Distribution have received the Software Package. Since digital computers can submit data for transmission across a network faster than the network can communicate the data to the receiver, this technique requires mechanisms to limit the number of simultaneous transmissions. One limit is identified above, a limit on the maximum number of concurrent transfers. This limit, however, does not solve a potential problem in internetworks which do not guarantee end-to-end reliable transmissions. For example, frame relay networks do not guarantee that data sent will be transmitted to the ultimate destination. This means that data messages can and are discarded as the NMS transmits to a remote Target across progressively slower frame relay links. The data loss is compensated for by re-transmission of the discarded data, but as network traffic increases, the number of re-transmissions can exceed the volume of data being transmitted correctly.

Therefore, the present invention also employs a technique referred to here as Congestion Control Groups. A Congestion Control Group is a set of two or more Targets which should not receive simultaneous transmissions. One or more Targets are assigned to at most one Congestion Control Group. Each Congestion Control Group is assigned a maximum number of concurrent transmissions to its members (n). When a distribution starts, the NMS and Hop Servers scan and periodically re-scan the list of Targets which are candidates for immediate transmission. The NMS or Hop Server cross-references the list of Congestion Control Group members currently receiving transmissions. If candidate Target is a member of a Congestion Control Group and n members of that group are presently receiving a transmission, then that candidate is disqualified from the current scan. Transmission to that candidate Target cannot begin until n−1 or fewer members of that group are currently receiving transmissions.

Although not pictured, one or more Targets may be grouped for convenience. A Software Package can then be transmitted to a group of Targets, rather than an individual target. Groups of Targets which all share the same mission-critical software can be grouped in a special set called a Profile. All members of a Profile have identical mission-critical software. Software Packages which are marked as Profile Software Packages may only be transmitted to one or more pre-specified Profiles. Before a Profile Software Package may be transmitted to a Profile, it must be certified by a system administrator as error-free. Profile Software Packages must be sent to the Profile members in the order in which it was certified. That is, if Profile Software Packages A, B, and C were certified in that order, then B cannot be transmitted to the Profile members until A has been successfully transmitted. Similarly, C cannot be transmitted before B. Software Packages, therefore, carry an attribute identifying whether they are Profile Software Packages.

A Collection Target (5) is another name for a Distribution Target when it receives and acts on a Collection Package. Collection Packages are similar to Distribution Packages, except that they list the data to be collected from the Collection Target. When the data is collected into a Software Package, it is then sent to a Collection Receiver (6). A Collection Package may be sent to one or more Collection Targets, but each Collection Package must specify exactly one Collection Receiver, which receives all the collected data. The Collection Receiver may be the same digital computer as the NMS.

A single digital computer may be at one time a Distribution Target, a Command Target, a Hop Server, and a Collection Target.

Figure 2:
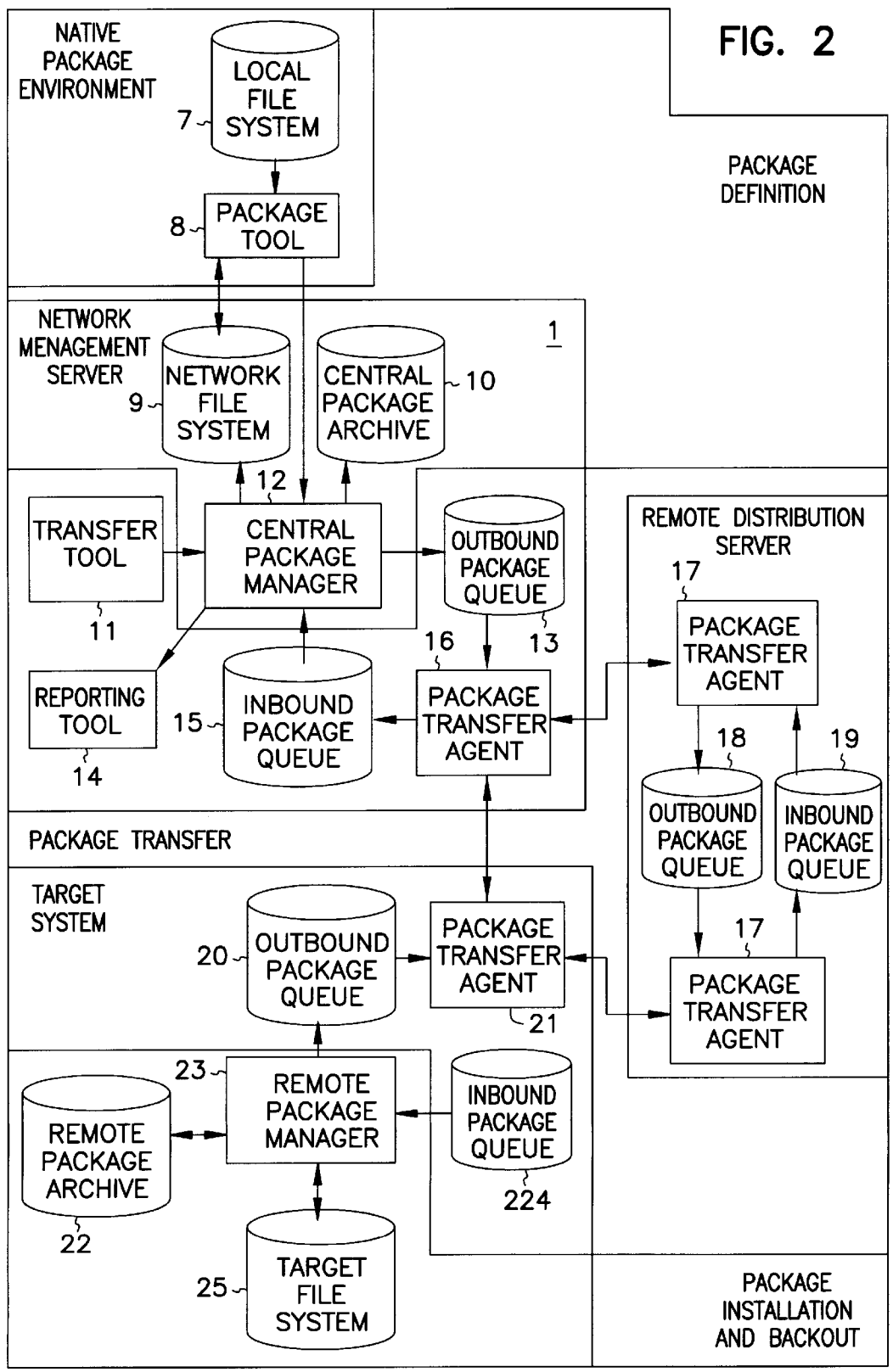
FIG. 2 is a detailed block diagram of the functional components employed by the present invention.

FIG. 2 shows a detailed block diagram of the functional components employed by the present invention. There are four generic digital computing environments indicated: Native Package, Network Manager Server, Remote Network Management Server, and Target System. The Native Package environment is the starting point for all packages. That is, all packages must be created in the native computing environment where they will ultimately be installed. For example, if a package is created for a personal computer (PC), it must be authored on a PC. The Network Management Server Environment is a multi-user digital computer, which excels at networking. It initiates transfers and reports status. The Remote Distribution Server environment is an optional environment, which can become a Hop Server (discussed above), a Staging Server (discussed below), or both. The Target System environment is the digital computer or computers which receives a transfer, either distribution, collection, or command. In this discussion, the term Software Package indicates a generic Package of type Distribution, Collection, or Command.

As the figure shows, these four environments support the three basic functions of the invention: Package Definition, Package Transfer, and Package Installation and Backout. Package Definition means that all the attributes of a package are specified, and the data is provided for the package. Package Transfer means that the package is transmitted via the internetwork to one or more Targets, optionally through a Remote Distribution Server. At the Target, the Package is installed. That is, software operable on the Target digitally messages the Software Package to install itself. If the installation fails, or if the Package is of type Backout discussed below), then the Package receives a digital message to backout instead of install.

All packages are constructed by using one or more tools on the local file system (7) of a Native Package digital computer. Files, scripts and data are drawn from this file system by using a software program called a Package Tool (8). The Package Tool enables the user to specify the following attributes for each package: (1) name, description and identifier for the package, (2) type of package (distribution, collection, or command), (3) name of author, (4) specific attributes of the methods, and (5) an optional assigned profile.

The Package Tool also enables the user to specify the package contents, including data files and methods.

In addition to raw network transmission, the network file system (9) is a means by which the Package Tool (8) can transfer its information to the Central Package Manager (12). The Central Package Manager (12) maintains the Central Package Archive (10), which is the central repository of all Software Packages for an enterprise. The Central Package Archive (10) may physically be placed on several digital computers, and need not be restricted to one computer. Once a Software Package is stored in the Central Package Archive (10), it may be transferred using the rest of the invention.

The Transfer Tool (11) is a computer program which accesses the Central Package Archive (10) to schedule transfers or one or more Software Packages. The Transfer Tool enables the user to specify the following attributes of a transfer: (1) name, description, and identifier for the transfer, (2) type of transfer (distribution, collection or command), (3) name of administrator scheduling transfer, (4) specific values for methods, (5) date and time for transmission, (6) date and time for installation, (7) specific attributes of backout image, (8) frequency of transfer (one-time or recurring), and (9) target for transfer (target computer, group, or profile).

Once a Software Package is scheduled for transmission via the internetwork to a target computer, group, or Profile, an indication is stored in the Outbound Package Queue (13). The Package Transfer Agent (16) program acts on this indication, and transfers the Package from the Central Package Archive (10) to the Target System, optionally through one or more Remote Distribution Servers. Return notifications from computers other than the Network Management Server are received by the Package Transfer Agent (16) and the Inbound Package Queue (15) to reach the Central Package Manager (12) and ultimately the Central Package Archive (10). The Reporting Tool (14) draws this information from the Central Package Archive (10) and Central Package Manager (12) to produce status reports on Packages and Transfers.

If a given Target System for a transfer is specified in the Central Package Manager to receive its transfers through a Hop Server or Staging Server, then the Software Package is transmitted to that computer by the Package Transfer Agent (17). The Hop or Staging Server receives the Software Package through its own Package Transfer Agent (21), which places it on its own Outbound Package Queue (18). Return notifications are placed by the Package Transfer Agent (17) on its own Inbound Package Queue (19), for transmission to the Network Management Server. The Package Transfer Agent transmits Packages on its Outbound Package Queue (18) to one or more Target Systems, which receive the Package through their Package Transfer Agent (21).

The Package Transfer Agent (21) on the Target System places packages on the Inbound Package Queue (24). The Remote Package Manager (23) acts on these queue entries to install or backout the Software Packages. The Remote Package Manager (23) returns indications to the Network Management Server by placing them on its own Outbound Package Queue (20), where the Package Transfer Agent (21) transmits them to the Network Management Station. In acting on a transmitted Software Package, the Remote Package Manager manipulates the local file system (25), and stores backout images in the Remote Package Archive (22) when appropriate.

Figure 3:
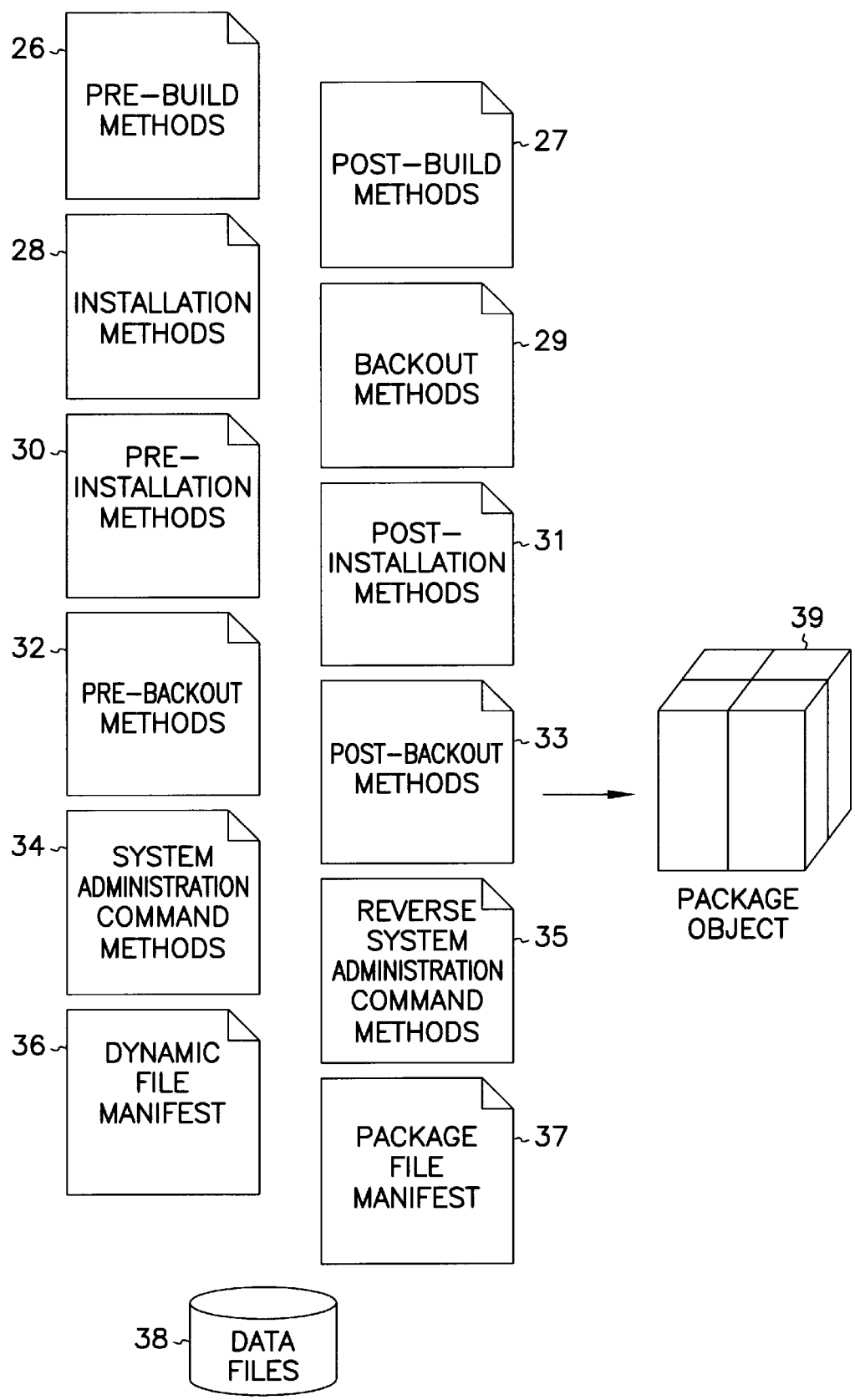
FIG. 3 is a diagram of the components of a Software Package (Package), which is the fundamental unit of transfer in the present invention.

FIG. 3 is a diagram of the components of a Software Package (Package), which is the fundamental unit of transfer in the present invention. The figure shows the Package (39) as an object, which is an entity containing both data and methods to act on that data. Methods may include, among other things, programs, scripts, instructions, additional data, and protocols. Methods are activated on the computer by messaging the appropriate method. That is, an agent program may initiate an installation by sending an "install" message to a Package.

A Package (39) may contain a pre-build method (26) which is messaged prior to assembling the package data files each time the package is transferred. For example, information may be extracted from a database, and placed into the Central Package Archive prior to building the package for transfer each time it is transferred. A Package may contain a post-build method (27), which is messaged after the build is complete each time a package is transferred. A Package will contain both installation (28) and backout methods (29). A Package may contain a pre-install method (30), which is messaged on each target computer prior to installing the Package. A Package may contain a post-install method (31), which is messaged after a successful installation on the target computer. A Package may contain a pre-backout method (32) which is messaged prior to backing the Package out on the Target computer. A Package may contain a post-backout method (33) which is messaged after a successful backout of the Package on the Target computer. A Command Package may contain a System Administration Command method (34), which performs some system administration function on the Target computer. A Command Package may contain a Reverse System Administration Command method (35) which reverses the effects of the System Administration Command method (34). A Distribution or Collection Package may contain a Dynamic File Manifest (36) which specifies the files to collect at package build time on the NMS, or at data collection time on the Target system. The Package must contain a Package File Manifest (37), specifying the files contained in the Package (if any), their attributes, and their sizes. Finally, the Package may contain data files (38), binaries, text, executables, etc. for transmission to the Target computer.

Figure 4:
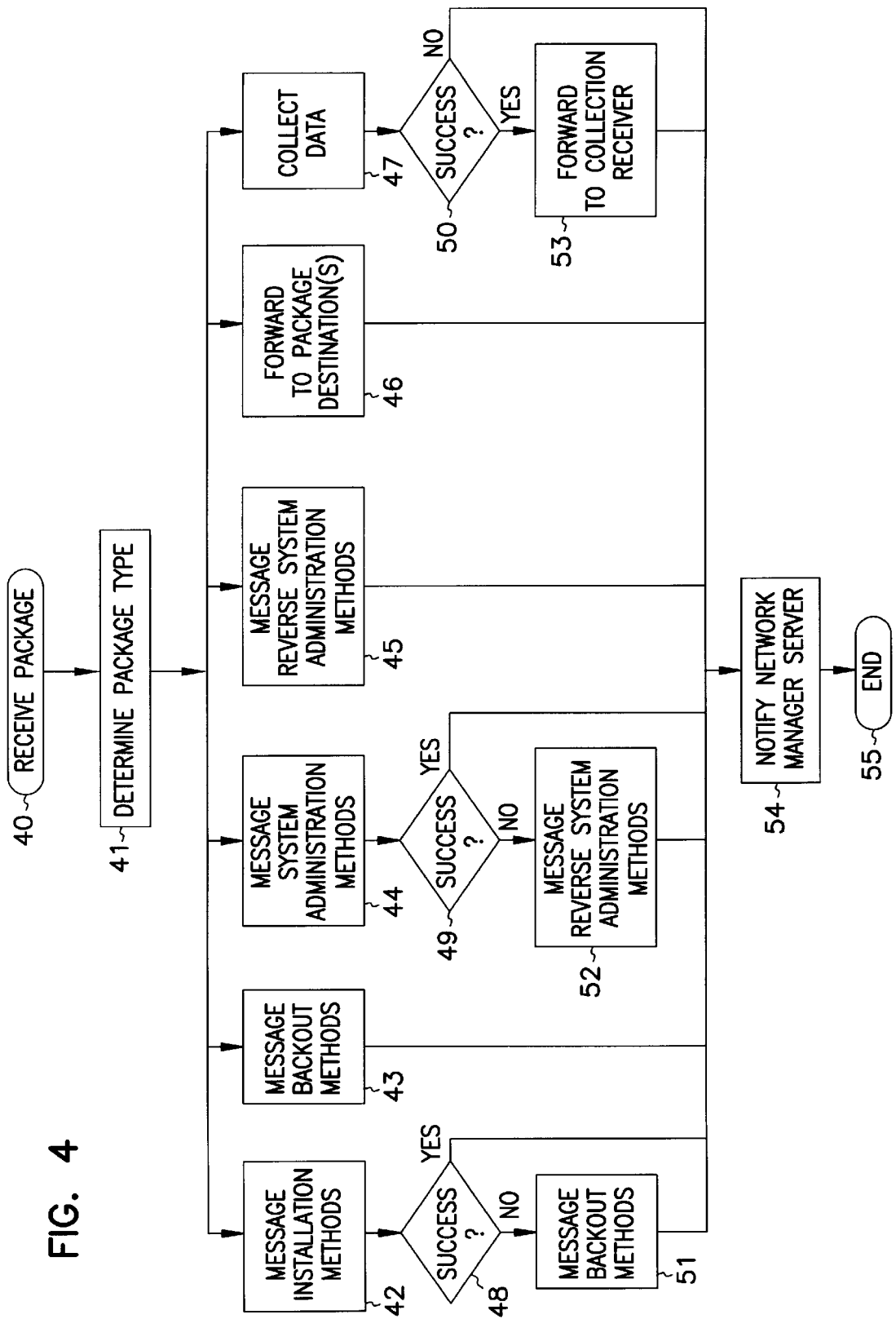
FIG. 4 is a block flow diagram of the functional components of the Remote Package Manager, which is the computer program which executes on a software distribution target.

FIG. 4 shows the actions taken by the Package Transfer Agent and Remote Package Manager (21, and 23 in FIG. 2) when operating on Packages in the Inbound or Outbound Package Queues (24, and 20 in FIG. 2). The Package Transfer Agent and Remote Package Manager may be combined into the same computer program, and will be referred to collectively here as Transfer Daemon.

The Transfer Daemon begins (40) by determining the Package Type (41), and acting accordingly. If the Package Type is Distribution, then it messages the Package to begin installation. The package then optionally messages a pre-install method, makes a backout image of data files affected by the Package as specified in the Package File Manifest (37 in FIG. 3), and installs the files into the Target's file system. If any of these steps fails (48), then the Transfer Daemon messages the backout methods (51) to reverse the affects of the package on the system. If the Package Type is Distribution Backout, then the Transfer Daemon messages the Software Package to initiate its backout methods (43). This includes optionally messaging the pre-backout methods, restoring the backout image of the affected files, and messaging the post-backout methods.

If the Package Type is Command, then the Transfer Daemon messages the Package to initiate the System Administration methods (44). If these methods fail (49), then the Transfer Daemon messages the Package to initiate Reverse System Administration methods (52). These methods should reverse the effects of the System Administration methods on the Target computer. If the Package Type is Backout Command, then the Transfer Daemon messages the Package to initiate Reverse System Administration methods (45).

If the Package Type is Hop Server, then the Transfer Daemon forwards the Package unmodified to the next one or more Targets (46). These Targets may be another Hop Server, or the ultimate destination for this transfer. If one of the specified Targets for the transmission is itself, the Transfer Daemon replaces a modified copy of the Package on its Inbound Package Queue for subsequent processing as if it were newly arrived.

If the Package Type is Collection, then the Transfer Daemon messages the Package to initiate data collection (47) on the Target. If the collection is a success (50), then the collected data is placed in Package format, and transmitted to the specified Collection Receiver (53).

At every step, the Transfer Daemon notifies the NMS of its progress and result (54). When complete (55), the Transfer Daemon re-scans its Inbound Package Queue for additional work.

Figure 5:
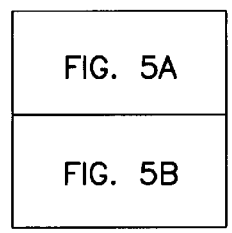
FIG. 5 is a block diagram of the functions performed by the Remote Package Manager when it is acting as a Staging Server for a software distribution target.
Figure 5A:
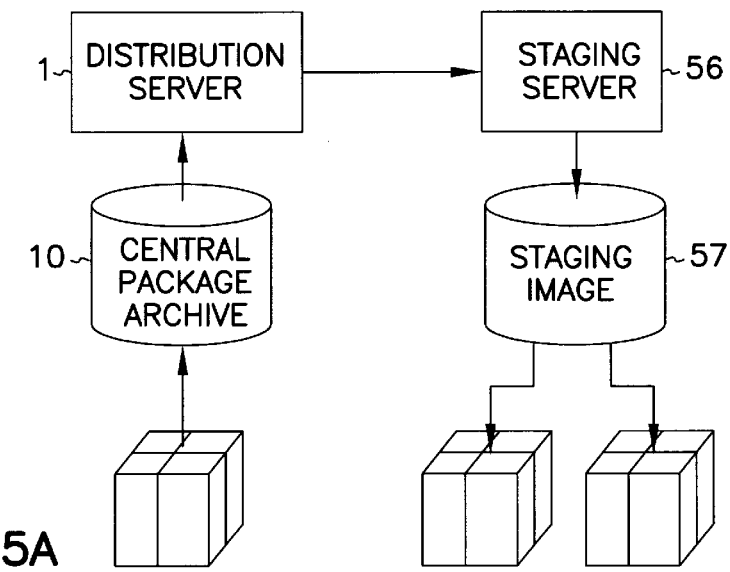
Figure 5B:
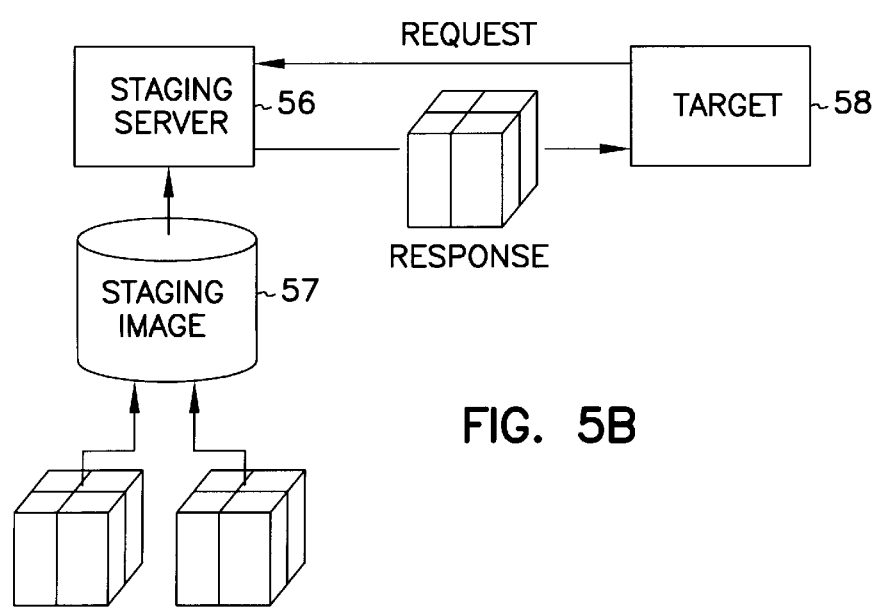

FIG. 5 shows the special case of a Staging Server and an Off-line Target. Not all computers are electrically connected to the internetwork at all times. They are sometimes "off-line". Therefore, a mechanism is implemented in the present invention to accommodate computers which connect occasionally. The mechanism is called a Staging Server (56), which is a computer to which an Off-line Target (58) is assigned. The Network Management Server (1) transmits packages from the Central Package Archive (10) to one or more Staging Servers (56). Each Staging Server stores the Package for the Off-line Target in its Staging Image (57) on its local disk. When an Off-line Target (58) connects to the internetwork, and requests its packages from the Staging Server (56), the Staging Server (56) draws queued packages from its Staging Image (57) and transmits them to the Off-line Target (58).

Figure 6:
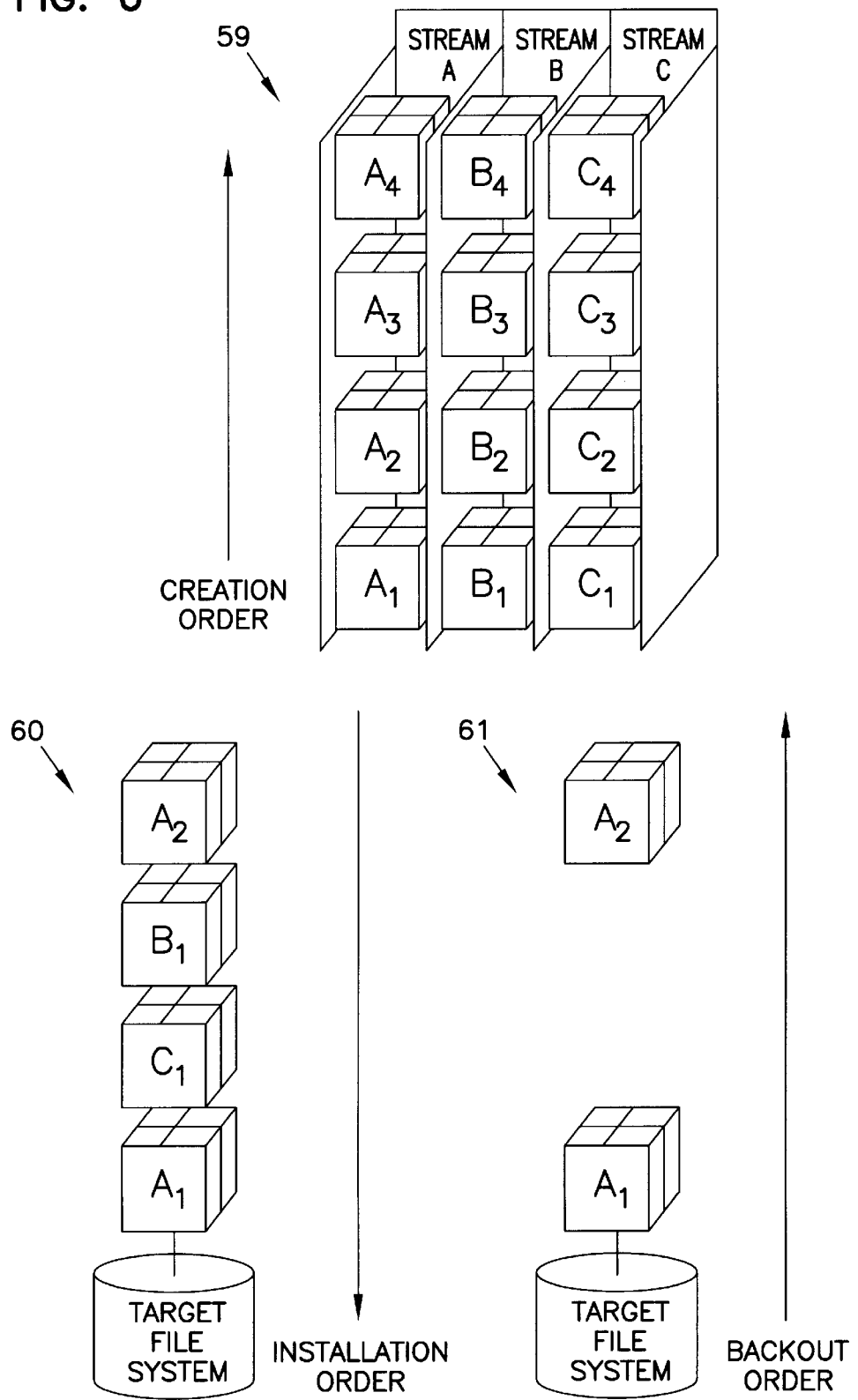
FIG. 6 is a block diagram showing the relationship between Packages and Package Streams.

FIG. 6 shows how Distribution Streams make Profile-based Distribution more flexible. Profiles are a mechanism to enforce software uniformity throughout the internetwork. A Profile is a set of Target computers, wherein each Target can belong to at most one Profile, and each member of a Profile has identical mission-critical software (as specified by the enterprise using the invention). Packages which contain mission-critical software are marked at a creation-time as authorized for transfer to specific Profiles. The Package can then only be transferred to those Profiles. A Package transferred to a Profile must install successfully on all members of that Profile. Before a Profile-bound Package may be scheduled for transfer to a Profile, it must be certified as error-free. When it is certified, the date and time of the certification is recorded. Packages must be transferred to a Profile in the chronological order that they were certified. That is, if packages A, B, and C are certified in that order, then they must be transferred to the Profile members in that order. They must also be backed out in the reverse order of installation. That is, C then B then A. This means that if package A must be backed out after B and C have been installed, C and then B must be backed out from all Profile members before A can be backed out. Since B and C are likely to be unrelated functionally to A, this could cause disruption on the Profile member machines in unintended areas. This problem is solved by the use of Distribution Streams.

Distribution Streams segregate Distribution Packages according to the data files that they affect. That is, Packages in stream A only manipulate a specified set of data files on any Profile member (59). Packages in stream B do not manipulate files specified as belonging to stream A or C. In this way, Packages can be certified and sent to Profile members in the order certified (60), but be backed out according to the stream to which they belong (61). Thus, if Package A1 is to be backed out, B1 and C1 may be safely left in place, and only A2 must be removed first. Since A2 is now likely to be related to A1, there is less likelihood of unintended affects of a backout.

Figure 7:
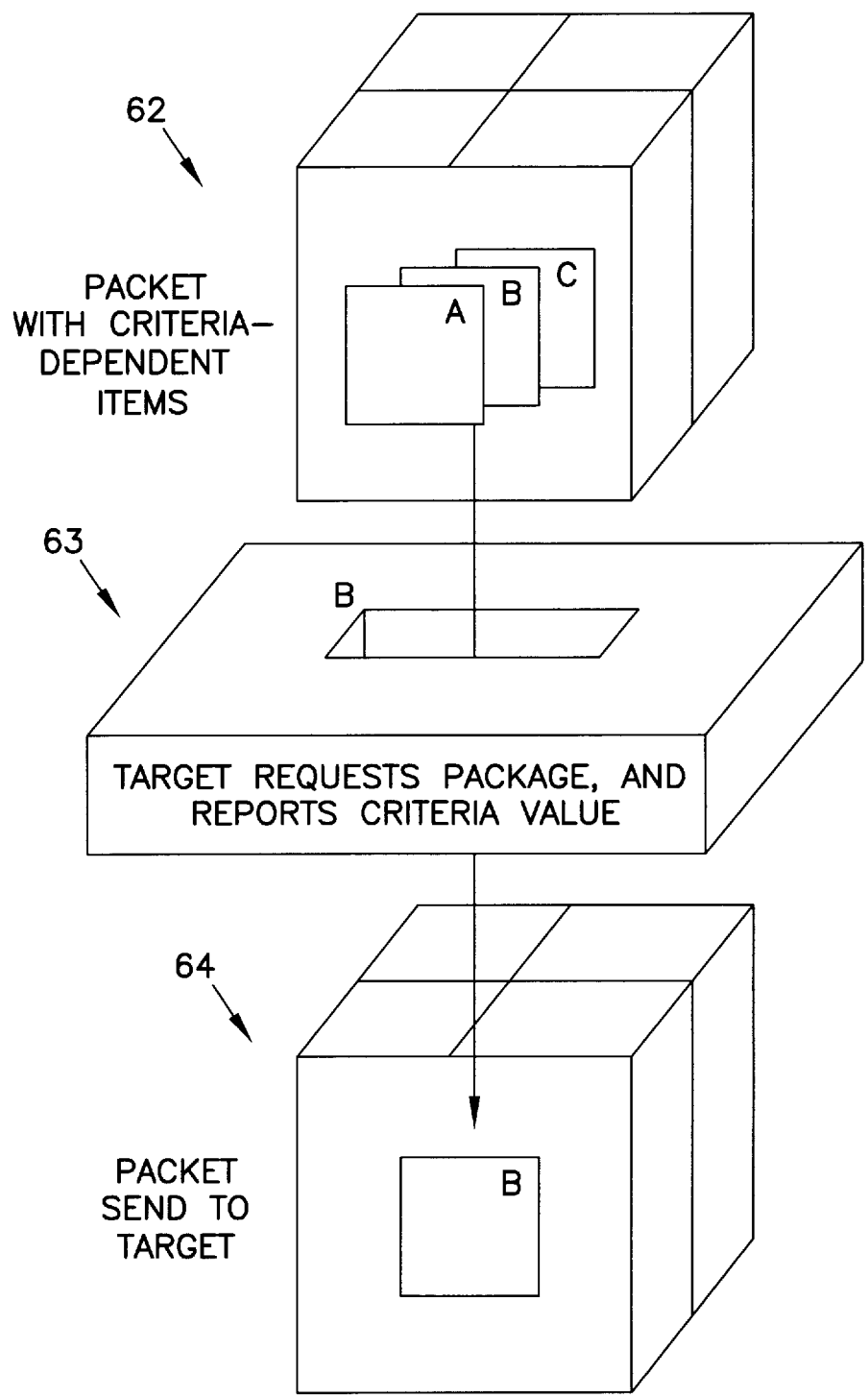
FIG. 7 is a block diagram showing the function of Distribution Criteria in the invention.

FIG. 7 shows the Criteria mechanism, used to customize packages for installation on an heterogeneous set of computers. Often, computers of the same type have different hardware and software configurations. Thus, one Native Package Environment (See FIG. 2) may not represent all possible Target configurations. To avoid requiring a different Package for each possible configuration, the concept of Criteria was invented. Each package may optionally contain criteria-dependent items within it. That is, for any given data file or method intended for the Target computer, the Package may contain several optional data files or methods (62). When the Target requests the Package, it reports its values for known criteria. The Transfer Daemon then removes optional data files and methods which are inappropriate for that criteria value (63). The modified package (64) received by the Target contains only appropriate data files and methods.

Figure 8:
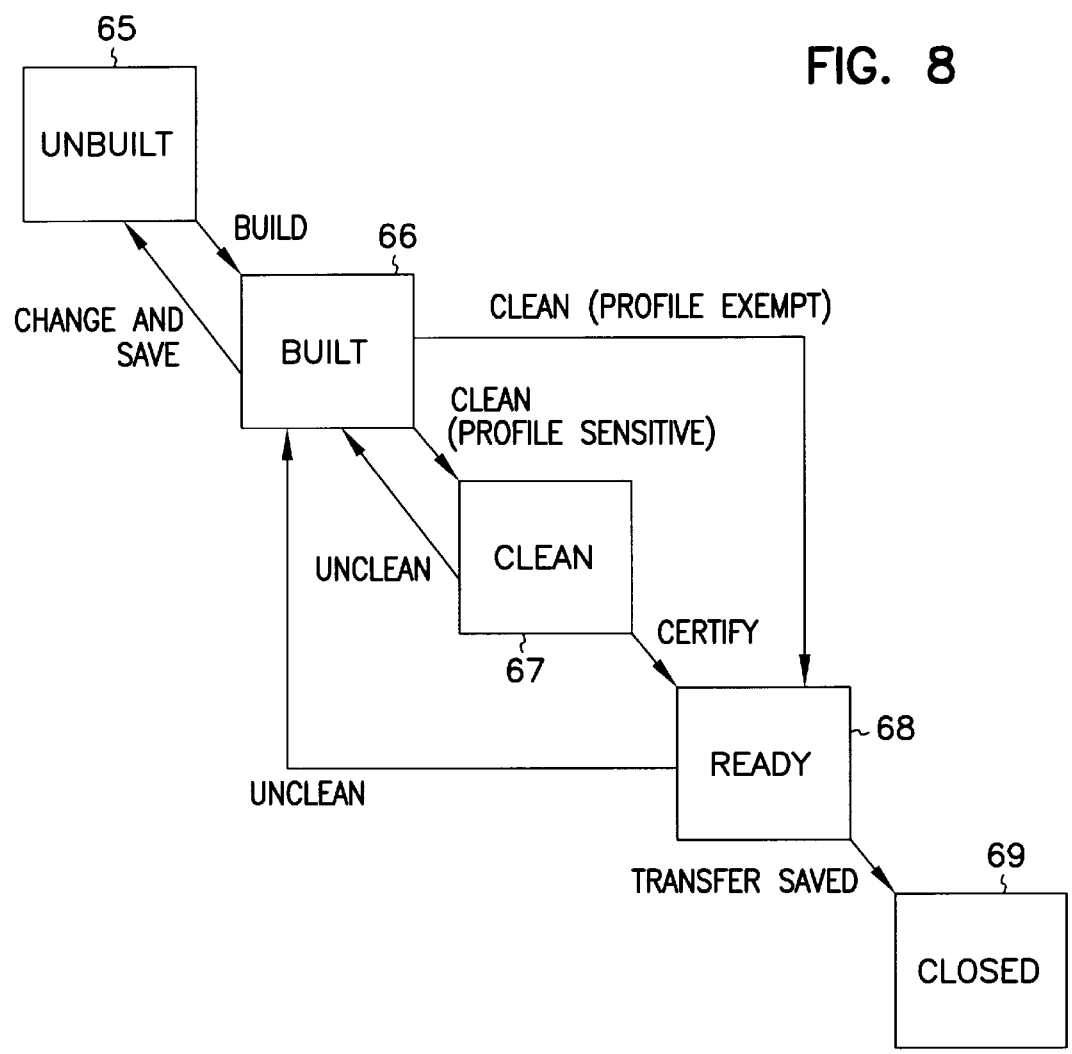
FIG. 8 is a block diagram showing the finite state machine for Software Packages.

FIG. 8 is a block diagram showing the finite state machine for Software Packages. Software Packages are stored in the Central Package Archive on the Network Management Server. As they are constructed and transferred to targets, their status changes in the Central Package Archive. When they are created, they are identified as Unbuilt (65). This indicates that the contents and methods of the Software Package have not been combined into an object for transmission. When the package is built (that is, combined into an object for transmission) the package is placed into Built status (66). Any time the Software Package contents or identifying information are modified and saved, the Software Package is returned to an Unbuilt (65) status. When a Software Package is Cleaned (that is, the methods and data are deleted from the Central Package Archive, leaving only an object for transmission) the package status is changed again. If the Software package is Profile-Sensitive (that is, authorized for one or more Profiles) then the status is changed to Clean (67). The package may be Uncleaned to restore the separate methods and data from the Software Package object, and to return its status to Built (66). If the Software Package is Profile-Exempt (that is, it may be transferred to individual targets or groups of targets) then the status is changed to Ready (68). Uncleaning a Profile-Exempt Software Package changes its status to Built (66). When a Profile-Sensitive Software Package is Certified for one or more Profiles (that is, it is approved as error-free and so indicated in the Central Package Archive) its status is changed to Ready (68). Once the status for a Software Package is set to Ready (68), it may be transferred to its designated target. Profile-Exempt Software Packages may be sent to Targets or groups of Targets; Profile-Sensitive Software Packages may be sent to the one or more Profiles for which it is Certified. Once a Software Package is transferred to any Target, its status is set to Closed (69), and it may not be removed from the Central Package Archive.

The inventor claims the following new and useful aspects of the invention:

1. A method of transferring digital computer programs and data from one or more source digital computers to one or more electronically connected target digital computers, each called a Target, the method comprising the steps of:
   a. establishing a Remote Package Manager within each Target;
   b. defining an installation method and a backout method, wherein the installation method includes the step of collecting information from the Target digital computer's memory or permanent storage, and transmitting said information to a third digital computer called a Collection Receiver;
   c. building a Package, wherein the step of building includes the step of combining the installation method and the backout method with digital computer programs and data into an object such that the Package includes embedded methods for installing and removing the digital computer programs and data;
   d. transferring the Package by electrically transmitting the Package in digital form to each Target; and
   e. unpacking the Package on each Target, wherein the step of unpacking includes the steps of:
      transmitting a message from the Remote Package Manager to the Package; and
      executing, as a function of the message transmitted from the Remote Package Manager, one or more of the embedded methods;
whereby the Package becomes a self-executing entity that acts autonomously in response to the message to execute one or more of the embedded methods.

2. The method according to claim 1, wherein the installation method includes the step of
   copying the digital computer programs and data to the Target digital computer's memory or permanent storage.

3. The method according to claim 1, wherein each Target may belong to exactly one set of Targets which all receive identical Packages in the identical order, called a Profile, in which an order is enforced for both installing and backing out the Package so that the most recently installed package must be backed out before the second most recently installed package may be backed out.

4. The method according to claim 1, wherein one of the Targets is a Staging Server used to store one or more Packages for an off-line digital computer which is not electrically connected to the network, but which occasionally is electrically connected, and wherein the step of transferring includes the steps of determining when the off-line digital computer is electrically connected to the network and retransmitting the Package from local storage facilities of the Target to the off-line digital computer during such times.

5. The method according to claim 1, wherein each Target may belong to exactly one set of Targets which all receive identical Packages in the identical order, called a Profile, in which an order is enforced for both installing and backing out the Package so that the most recently installed package must be backed out before the second most recently installed package may be backed out, and
   wherein each Package is assigned to exactly one set of Packages, called a Distribution Stream, based on the effects it has upon a Target, such that Packages can be backed out of the Target in other than the order installed by removing only those previously installed Packages from the same Distribution Stream.

6. The method according to claim 1, wherein each Target may belong to exactly one set of Targets which all receive identical Packages in the identical order, called a Profile, in which an order is enforced for both installing and backing out the Package so that the most recently installed package must be backed out before the second most recently installed package may be backed out,
   wherein each Package is assigned to exactly one set of Packages, called a Distribution Stream, based on the effects it has upon a Target, such that Packages can be backed out of the Target in other than the order installed by removing only those previously installed Packages from the same Distribution Stream,
   wherein one of the Targets is a Staging Server used to store one or more Packages for an off-line digital computer which is not electrically connected to the network, but which occasionally is electrically connected, and wherein the step of transferring includes the steps of determining when the off-line digital computer is electrically connected to the network and retransmitting the Package from local storage facilities of the Target to the off-line digital computer during such times,
   wherein each Package may contain one or more data items which depend on pre-specified configuration values of the Target, called Criteria, and from which one or more criteria-dependent data items are selected during the transfer, and
   wherein the step of transferring the Package further includes the step of transmitting the Package to a pre-defined maximum number of Targets simultaneously, wherein the step of transmitting includes the steps of determining when the pre-defined maximum number of simultaneous transfers is reached, waiting for other transfers to complete and then making additional simultaneous transfers as the other transfers complete.

7. The method according to claim 1, wherein the step of building a Package includes the step of assigning a Package Type to the Package and wherein the step of unpacking the Package further includes the steps of determining the Package Type assigned to the Package and selecting the message to be transmitted from the Remote Package Manager as a function of the Package Type.

8. A method of transferring digital computer programs and data from one or more source digital computers to one or more electronically connected target digital computers, each called a Target, the method comprising the steps of:
   a. establishing a Remote Package Manager within each Target;
   b. defining an installation method and a backout method;
   c. building a Package, wherein the step of building includes the step of combining the installation method and the backout method with digital computer programs and data into an object such that the Package includes embedded methods for installing and removing the digital computer programs and data;
   d. transferring the Package by electrically transmitting the Package in digital form to each Target, wherein the step of transferring includes the step of re-transmitting the Package from one of the Targets to one or more digital computers specified by the Package; and e. unpacking the Package on each Target, wherein the step of unpacking includes the steps of:
    transmitting a message from the Remote Package Manager to the Package; and
    executing, as a function of the message transmitted from the Remote Package Manager, one or more of the embedded methods;

whereby the Package becomes a self-executing entity that acts autonomously in response to the message to execute one or more of the embedded methods.

9. The method according to claim 8, wherein the step of retransmitting includes the step of retransmitting the Package from one of the Targets to itself.

10. The method according to claim 8, wherein each Target may belong to exactly one set of Targets which all receive identical Packages in the identical order, called a Profile, in which an order is enforced for both installing and backing out the Package so that the most recently installed package must be backed out before the second most recently installed package may be backed out.

11. The method according to claim 8, wherein one of the Targets is a Staging Server used to store one or more Packages for an off-line digital computer which is not electrically connected to the network, but which occasionally is electrically connected, and wherein the step of transferring includes the steps of determining when the off-line digital computer is electrically connected to the network and retransmitting the Package from local storage facilities of the Target to the off-line digital computer during such times.

12. The method according to claim 8, wherein each Target may belong to exactly one set of Targets which all receive identical Packages in the identical order, called a Profile, in which an order is enforced for both installing and backing out the Package so that the most recently installed package must be backed out before the second most recently installed package may be backed out, wherein each Package is assigned to exactly one set of Packages, called a Distribution Stream, based on the effects it has upon a Target, such that Packages can be backed out of the Target in other than the order installed by removing only those previously installed Packages from the same Distribution Stream, wherein one of the Targets is a Staging Server used to store one or more Packages for an off-line digital computer which is not electrically connected to the network, but which occasionally is electrically connected, and wherein the step of transferring includes the steps of determining when the off-line digital computer is electrically connected to the network and retransmitting the Package from local storage facilities of the Target to the off-line digital computer during such times, wherein each Package may contain one or more data items which depend on pre-specified configuration values of the Target, called Criteria, and from which one or more criteria-dependent data items are selected during the transfer, and wherein the step of transferring the Package further includes the step of transmitting the Package to a pre-defined maximum number of Targets simultaneously, wherein the step of transmitting includes the steps of determining when the pre-defined maximum number of simultaneous transfers is reached, waiting for other transfers to complete and then making additional simultaneous transfers as the other transfers complete.

13. The method according to claim 8, wherein the step of building a Package includes the step of assigning a Package Type to the Package and wherein the step of unpacking the Package further includes the steps of determining the Package Type assigned to the Package and selecting the message to be transmitted from the Remote Package Manager as a function of the Package Type.

14. A method of transferring digital computer programs and data from one or more source digital computers to one or more electronically connected target digital computers, each called a Target, the method comprising the steps of:

a. establishing a Remote Package Manager within each Target;

b. defining an installation method and a backout method;

c. building a Package, wherein the step of building includes the step of combining the installation method and the backout method with digital computer programs and data into an object such that the Package includes embedded methods for installing and removing the digital computer programs and data;

d. transferring the Package by electrically transmitting the Package in digital form to each Target; and e. unpacking the Package on each Target, wherein the step of unpacking includes the steps of:
    transmitting a message from the Remote Package Manager to the Package; and
    executing one or more of the embedded methods;

wherein each Target may belong to exactly one set of Targets which all receive identical Packages in the identical order, called a Profile, in which an order is enforced for both installing and backing out the Package so that the most recently installed package must be backed out before the second most recently installed package may be backed out;

whereby, upon receiving the message transmitted from the Remote Package Manager, the Package becomes a self-executing entity that acts autonomously in response to the message to execute one or more of the embedded methods.

15. The method according to claim 4, wherein one of the Targets is a Staging Server used to store one or more Packages for an off-line digital computer which is not electrically connected to the network, but which occasionally is electrically connected, and wherein the step of transferring includes the steps of determining when the off-line digital computer is electrically connected to the network and retransmitting the Package from local storage facilities of the Target to the off-line digital computer during such times.

16. A process embodied in claim 14, wherein each Package may contain one or more data items which depend on pre-specified configuration values of the Target, called Criteria, and from which one or more criteria-dependent data items are selected during the transfer.

17. The method according to claim 14, wherein the step of transferring includes the step of scheduling the Package for distribution within the network.

18. The method according to claim 14, wherein the step of building a Package includes the step of assigning a Package Type to the Package and wherein the step of unpacking the Package further includes the steps of determining the Package Type assigned to the Package and selecting the message to be transmitted from the Remote Package Manager as a function of the Package Type.

19. A method of transferring system configuration information from one or more digital computers to one or more electronically connected Target digital computers, the method comprising the steps of:
   a. establishing a Remote Package Manager within each Target;
   b. defining an installation method and a backout method;
   c. building a Package having a Package type, wherein the step of building includes the step of combining the installation method and the backout method with the system configuration information into an object such that the Package includes embedded methods for modifying the system configuration of the Target digital computer according to said system configuration information;
   d. assigning a plurality of Target digital computers to a Profile, wherein the Profile defines an order to be followed for both installing and backing out the Package so that the most recently installed package must be backed out before the second most recently installed package may be backed out;
   e. transferring the Package at or after a pre-designated time by electrically transmitting the Package in digital form to one or more Target digital computers; and
   f. unpacking the Package on each Target digital computer by invoking the embedded installation method, wherein the step of unpacking includes the steps of:
      determining, at the Remote Package Manager, the Package type; and
      transmitting a message from the Remote Package Manager to the Package as a function of the Package type;
   whereby the Package becomes a self-executing entity that acts autonomously in response to the message received from the Remote Package Manager to execute one or more of the embedded methods.

20. The method according to claim 19, wherein the installation method includes the step of performing a pre-configured system administration function on the Target digital computer to alter the Target digital computer's software configuration.

21. The method according to claim 19, wherein one of the Target digital computers is a Staging Server used to store one or more Packages for a off-line digital computer which is not electrically connected to the network, but which occasionally is electrically connected, and wherein the step of transmitting includes the steps of:
   determining when the off-line digital computer is electrically connected to the network; and
   retransmitting the Package from local storage facilities of the Staging Server to the off-line digital computer during such times.

22. A software distribution system, comprising:
   an internetwork;
   a network management server connected to the internetwork, wherein the network management server includes:
      a central package archive, wherein the central package archive stores packages, wherein each package stored in the central package archive includes a package type, digital computer programs and data and embedded methods for installing and removing the digital computer programs and data;
      an outbound package queue;
      a central package manager connected to the central package archive and the outbound package queue, wherein the central package manager transfers one of said packages between the central package archive and the outbound package queue; and
      a package transfer agent connected to the outbound package queue, wherein the package transfer agent transfers packages from the outbound package queue to the internetwork; and
   a target system, wherein the target system includes:
      an inbound package queue;
      a package transfer agent connected to the inbound package queue, wherein the package transfer agent transfers packages from the internetwork to the inbound package queue; and
      a remote package manager connected to the inbound package queue, wherein the remote package manager reads the package type of packages stored in the inbound package queue and messages the package as a function of the package type;
   whereby the package becomes a self-executing entity that acts autonomously in response to the message received from the remote package manager to execute one or more of the embedded methods.

23. The software distribution system according to claim 22, wherein the target system further comprises an outbound package queue, connected to the remote package manager and the package transfer agent, wherein the outbound package queue receives packages assembled by the remote package manager.

24. The software distribution system according to claim 23, wherein the target system further comprises a target file system, connected to the remote package manager, wherein the remote package manager includes means for assembling a package as a function of data stored in the target file system and wherein the package transfer agent includes means for transferring the assembled package to a collection receiver.

25. A software distribution system, comprising:
   a network management server, wherein the network management server includes:
      a central package archive, wherein the central package archive stores packages, wherein each package stored in the central package archive includes a package type, digital computer programs and data and embedded methods for installing and removing the digital computer programs and data;
      an outbound package queue;
      a central package manager connected to the central package archive and the outbound package queue, wherein the central package manager transfers one of said packages between the central package archive and the outbound package queue; and
      a package transfer agent connected to the outbound package queue, wherein the package transfer agent transfers packages from the outbound package queue to the internetwork;
   a distribution server connected to the network management server, wherein the distribution server includes:
      an outbound package queue;
      a first package transfer agent connected to the outbound package queue, wherein the first package transfer agent receives packages from the package transfer agent of the network management server and stored the packages to the outbound package queue; and
      a second package transfer agent connected to the outbound package queue, wherein the second package transfer agent transfers packages from the outbound package queue; and
   a target system connected to the distribution server, wherein the target system includes:

an inbound package queue;

a package transfer agent connected to the inbound package queue and to the second package transfer agent of the distribution server, wherein the package transfer agent transfers packages from the outbound package queue of the distribution server to the inbound package queue; and a remote package manager connected to the inbound package queue, wherein the remote package manager reads the package type of packages stored in the inbound package queue and messages the package as a function of the package type;

whereby the package becomes a self-executing entity that acts autonomously in response to the message received from the remote package manager to execute one or more of the embedded methods.

26. The software distribution system according to claim 25, wherein the software distribution system further comprises:

an off-line target; and a staging server connected to the distribution server, wherein the staging server includes:

local data storage; and a staging server package manager connected to the distribution server and the local data storage, wherein the remote package manager queues packages received from the distribution server in a staging image stored on the local data storage and transfers the queued packages to the off-line target when the off-line target establishes communication with the staging server.

27. The software distribution system according to claim 25, wherein the target system further comprises an outbound package queue, connected to the remote package manager and the package transfer agent, wherein the outbound package queue receives packages assembled by the remote package manager.

28. The software distribution system according to claim 27, wherein the target system further comprises a target file system, connected to the remote package manager, wherein the remote package manager includes means for assembling a package as a function of data stored in the target file system and wherein the package transfer agent includes means for transferring the assembled package to a collection receiver.

* * * * *

UNITED STATES PATENT AND TRADEMARK OFFICE
CERTIFICATE OF CORRECTION

PATENT NO. : 5,845,090
DATED : Dec. 1, 1998
INVENTOR(S) : Theodore J. Collins, III, et al.

It is certified that error appears in the above-identified patent and that said Letters Patent is hereby corrected as shown below:

At Col. 12, line 43, please replace "4" with --14--.

At Col. 9, lines 8-9, please replace "The inventor claims the following new and useful aspects of the invention:" with --What is claimed is:--.

Signed and Sealed this

Twenty-first Day of November, 2000

Attest:

Q. TODD DICKINSON

*Attesting Officer*    *Director of Patents and Trademarks*